(12) United States Patent
Cha et al.

(10) Patent No.: US 9,940,960 B2
(45) Date of Patent: Apr. 10, 2018

(54) AIR-BEARING DESIGN FOR HYDROCARBON AND LUBE PICK-UP IMPROVEMENTS IN HARD DISK DRIVE (HDD)

(71) Applicants: SAE Magnetics (H.K.) Ltd., Shatin, N.T. (HK); Headway Technologies, Inc., Milpitas, CA (US)

(72) Inventors: Ellis Cha, San Ramon, CA (US); Sindy Yeung, San Ramon, CA (US); Penny Wan Ting Looi, Shatin (HK); Ben Kwun Pan Ng, Kwun Tong (HK)

(73) Assignees: SAE Magnetics (HK) Ltd., Shatin, N.T. (HK); Headway Technologies, Inc., Milpitas, CA (US)

( * ) Notice: Subject to any disclaimer, the term of this patent is extended or adjusted under 35 U.S.C. 154(b) by 0 days.

(21) Appl. No.: 15/162,704

(22) Filed: May 24, 2016

(65) Prior Publication Data
US 2017/0345452 A1    Nov. 30, 2017

(51) Int. Cl.
  *G11B 5/60* (2006.01)
(52) U.S. Cl.
  CPC .......... *G11B 5/6082* (2013.01); *G11B 5/6005* (2013.01)
(58) Field of Classification Search
  CPC .............................. G11B 5/6082; G11B 5/6005
  See application file for complete search history.

(56) References Cited

U.S. PATENT DOCUMENTS

| | | | | |
|---|---|---|---|---|
| 4,984,114 A * | 1/1991 | Takeuchi | ............. | G11B 5/6005 360/236.4 |
| 5,079,657 A * | 1/1992 | Aronoff | ................. | G11B 33/14 360/236.6 |
| 5,267,104 A * | 11/1993 | Albrecht | ............. | G11B 5/6005 360/234.1 |
| 5,768,055 A * | 6/1998 | Tian | ..................... | G11B 5/6005 360/235.2 |
| 5,801,903 A * | 9/1998 | Meyer | .................... | G11B 5/581 360/234.1 |
| 6,212,042 B1 * | 4/2001 | Gui | ....................... | G11B 5/6005 360/234.1 |
| 6,215,621 B1 * | 4/2001 | Boutaghou | .......... | G11B 5/6005 360/236.6 |
| 6,233,118 B1 * | 5/2001 | Boutaghou | .............. | G11B 5/10 360/235.4 |
| 6,366,429 B1 * | 4/2002 | Stover | ................... | G11B 5/6005 360/236.6 |
| 6,441,999 B1 * | 8/2002 | Tang | ...................... | G11B 21/21 360/236.6 |

(Continued)

*Primary Examiner* — Brian Miller
(74) *Attorney, Agent, or Firm* — Saile Ackerman LLC; Stephen B. Ackerman

(57) ABSTRACT

A slider design for a hard disk drive (HDD) features an air-bearing surface (ABS) topography with arrays of micro-dots formed on bases of a multiplicity of cavities at different depths. The design eliminates the accumulation of hydrocarbons (e.g., spindle oil and disk lubricant) deposits in regions of air stagnation within the cavities where backflows and foreflows of air meet and cancel during HDD operation. The micro-dots are small raised regions of various shapes having sizes and spacings in the range between 2 and 100 microns and, in a preferred embodiment, heights of 0.15 microns above the cavity bases.

13 Claims, 5 Drawing Sheets

(56) References Cited

U.S. PATENT DOCUMENTS

| | | | | |
|---|---|---|---|---|
| 6,459,547 B1* | 10/2002 | Riddering | G11B 5/6005 | 360/135 |
| 6,466,410 B2* | 10/2002 | Polycarpou | G11B 21/21 | 360/236.6 |
| 6,490,134 B2* | 12/2002 | Boutaghou | G11B 21/21 | 360/235.6 |
| 6,504,682 B1* | 1/2003 | Sannino | G11B 5/60 | 360/235.8 |
| 6,510,027 B1* | 1/2003 | Chapin | G11B 5/60 | 360/235.7 |
| 6,529,347 B2* | 3/2003 | Hipwell | G11B 5/6005 | 360/236.6 |
| 6,535,352 B2* | 3/2003 | Xuan | G11B 5/10 | 360/135 |
| 6,603,639 B1* | 8/2003 | Polycarpou | G11B 5/6005 | 360/235.8 |
| 6,674,611 B2* | 1/2004 | Bolasna | G11B 5/6005 | 360/235.6 |
| 6,747,847 B2* | 6/2004 | Stoebe | G11B 5/6005 | 360/235.7 |
| 6,785,093 B2* | 8/2004 | Baba | G11B 5/6005 | 360/235.6 |
| 7,023,664 B2* | 4/2006 | Crone | G11B 5/6005 | 360/235.7 |
| 7,106,556 B2* | 9/2006 | Pendray | G11B 5/6005 | 360/235.8 |
| 7,154,709 B2* | 12/2006 | Rao | G11B 5/6082 | 360/235.8 |
| 7,227,723 B2* | 6/2007 | Nath | G11B 21/21 | 360/235.7 |
| 7,262,937 B2* | 8/2007 | Pendray | G11B 5/6005 | 360/235.1 |
| 7,301,726 B1* | 11/2007 | Suzuki | G11B 21/22 | 360/97.11 |
| 7,643,251 B1* | 1/2010 | Zhang | G11B 5/6005 | 360/235.6 |
| 7,961,433 B2* | 6/2011 | Zheng | G11B 5/6005 | 360/236.5 |
| 8,094,411 B2* | 1/2012 | Huang | G11B 5/6005 | 360/235.8 |
| 8,102,626 B2* | 1/2012 | Li | G11B 5/60 | 360/235.5 |
| 8,116,037 B2* | 2/2012 | Kohira | G11B 5/6005 | 360/235.7 |
| 8,184,402 B2* | 5/2012 | Ookubo | G11B 5/6005 | 360/235.7 |
| 8,184,405 B1* | 5/2012 | Zheng | G11B 5/102 | 360/266.3 |
| 8,203,805 B2* | 6/2012 | Huang | G11B 5/40 | 360/235.4 |
| 8,289,653 B2* | 10/2012 | Huang | G11B 5/6005 | 360/235.6 |
| 8,649,126 B2* | 2/2014 | Bolasna | G11B 5/6005 | 360/235.4 |
| 8,810,967 B2* | 8/2014 | Ramakrishnan | G11B 5/6082 | 360/235.5 |
| 8,988,830 B1 | 3/2015 | Peng et al. | | |
| 9,082,441 B1* | 7/2015 | Hu | G11B 5/6082 | |

* cited by examiner

AIR-BEARING DESIGN FOR HYDROCARBON AND LUBE PICK-UP IMPROVEMENTS IN HARD DISK DRIVE (HDD)

BACKGROUND

1. Technical Field

This disclosure relates to magnetic write heads that write on magnetic recording media, particularly to the air-bearing surface (ABS) topography of such write heads and methods to improve their performance.

2. Description

Hard disk drives (HDD) have been increasing the recording density of the magnetic disks on which data storage occurs. Correspondingly the thin-film magnetic heads used to write and read that data have been required to improve their performance as well. The thin-film read/write heads most commonly in use are of a composite type, having a structure in which a magnetism detecting device, such as a magnetoresistive (MR) read sensor is used together with a magnetic recording device, such as an electromagnetic coil device. These two types of devices are laminated together and serve to read/write data signals, respectively, from/onto magnetic disks which are the magnetic recording media.

As is well known, the read/write heads are mounted in a "slider", shown in highly schematic side view in (prior art) FIG. 1. Referring to FIG. 1, there is shown the slider, 7, mounted on the distal end of a flexible mounting, 150, called a head gimbal assembly (HGA). The slider floats above the surface of a rapidly rotating hard disk, 15, on a flowing layer of air, 25, as the hard disk rotates. The edge of the slider, 200, towards which the airflow (and rotating disk surface) is directed, is called the leading edge. The distal edge of the slider, 100, is called the trailing edge (TE). The read/write head, 30, resides at the TE of the slider which, during HDD operation, is typically tipped downward towards the disk surface and is closest to the surface. The height, 80, of the slider above the hard disk surface is called the flying height. The surface of the slider closest to the hard disk, 300, which rides on the layer of flowing air and faces the disk is called its air-bearing surface (ABS). A read/write head assembly, 30, is mounted in the slider at its TE.

Referring to (prior art) FIG. 2, there is shown a highly schematic isometric drawing of a simple slider for the purpose of illustrating its topography, including incised channels, 320, and the position of the read/write head, 30, in a structure, 330, at the trailing edge surface, 100. The ABS, 300, is the maximum height of the slider surface above the floor of the channels, which may be formed at multiple depths, but are here shown as being of a single constant depth. The side edges of the slider, 325, are called rails and they form the lateral boundaries of the two channels. The ABS of a more typical slider (as will be described herein) is incised with a much more complex structure of ridges, channels and cavities, of carefully constructed lengths, shapes and depths, designed to enhance the slider's aerodynamic stability as it moves across the surface of the disk.

Referring now to schematic (prior art) FIG. 3, there is shown the slider of FIG. 1 (or FIG. 2) during actual HDD operation. During HDD operation, hydrocarbons (spindle motor oil) from the spindle motor transfers to the entire drive and it easily gets into the head-disk interface. The hard disk surface, 15, is here shown with a (highly magnified) layer of small circles representing two types of lubricant that can become entrained in the airflow, 25, between the disk and the slider. Circles, 150, might represent lubricant normally covering the surface of the disk itself, while circles, 155, might represent hydrocarbon from the spindle motor oil. The hydrocarbons experience air-bearing pressure gradients, 160, shown here as a curved line whose shape indicates variations is air pressure that form between the rotating disk and the ABS. The pressure gradient sucks up hydrocarbon, (small circles, 170,) residing on the disk and deposits it on the TE, 100, and also draws it into the system of channels incised into on the slider ABS.

Referring to schematic (prior art) FIG. 4, there is shown the situation of FIG. 3 subsequent to particles of hydrocarbon, 175, being sucked into the ABS through channel openings in the TE of the slider (see 320 in FIG. 2). The airflow pressure gradients produce a complex system of streamlines in the ABS topography (not shown) which can be separated into regions of foreflow, 210, and backflow, 220, corresponding respectively to flow directions along the prevailing (leading edge to trailing edge) airflow, 25, or against it. These two directions of airflow create pressure gradients and associated shear forces, 211, 221, directed along the ABS, that carry the particles of hydrocarbon with them. For example, particle, 175, is here shown entrained in a region of backflow, 220. Hydrocarbons tend to build up and accumulate at the topographic region of the of the slider ABS where there is airflow stagnation, 230, and at which the forces 211 and 221 cancel. This region (or regions) occurs where forward airflow (foreflow) and backward airflow (backflow) meet.

The hydrocarbon pick-up process usually takes time to occur. A heavy hydrocarbon accumulation on the slider-embedded heads is usually observed after a long test of the HDD drive lasting a few thousand hours. Such an accumulation can lead to drive failures as evidenced by read/write signal errors. This typically occurs when the read/write head clearance (head to disk spacing) cannot stabilize because hydrocarbons are accumulating on the ABS. The amount of hydrocarbon pick-up from the spindle oil is typically much greater than that resulting from the lubricant on the disks because a great deal of spindle oil is used in the drives. The hydrocarbon pick-up is not limited to any particular platform or rotational speed (rpm) in the HDD. Furthermore, it is becoming more and more critical in relation to reliability concerns.

Although the prior art has taught approaches to mitigate the effects of hydrocarbon buildup, none has demonstrated an effectiveness that is commensurate with the critical nature of the problem. Three examples are the following. U.S. Pat. No. 8,988,830 (Peng et al.) shows lubricant blockers and lubricant guiding channels on the ABS surface. U.S. Pat. No. 8,649,126 (Bolasna et al.) teaches forming deep recesses in front of the trailing pad and island pad and between them to reduce peak pressure and reduce lubricant pick-up. U.S. Pat. No. 8,289,653 (Huang et al.) shows lubricant control surfaces or dams on ABS to redirect airflow or lubricant. The present disclosure will provide a method to address the problem of hydrocarbon build-up that is more effective than prior art approaches.

SUMMARY

The first object of this disclosure is to fabricate a slider with an ABS topography that will eliminate or strongly mitigate the problem of hydrocarbon (i.e., lubricant) build-up during HDD operation.

A second object of this disclosure is to fabricate such a slider ABS topography that is effective in eliminating hydrocarbon buildup originating from both media lubricant and spindle motor lubricant.

A third object of the present disclosure is to provide both the geometry of the topography and a method of producing that topography.

These objects will be achieved by a topographical design of a slider body that will emphasize the elimination of variously directed airflows (backflows and foreflows) that are responsible for the creation of areas of air stagnation that allow the flow-entrapped hydrocarbons (various types of lubricants) to accumulate. The backflows will be eliminated by an arrangement of channels and cavities that direct the airflow advantageously and by the formation of a pattern of micro-dots, essentially small islands rising above the floors of the etched cavity surfaces, that mitigate the accumulation of hydrocarbons within these channels and cavities by eliminating regions of backflow that cause stagnation.

DETAILED DESCRIPTION

Figure 1:
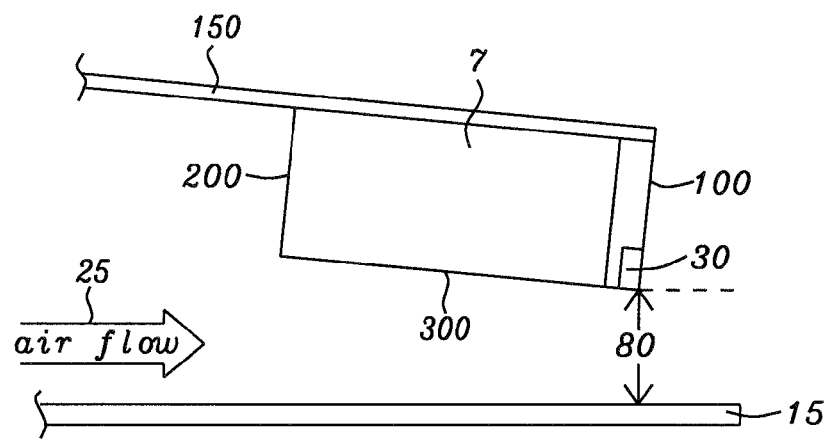
FIG. 1 is a schematic representation (side view) of a prior art slider flying above moving recording media (i.e., a rotating hard disk).
Figure 2:
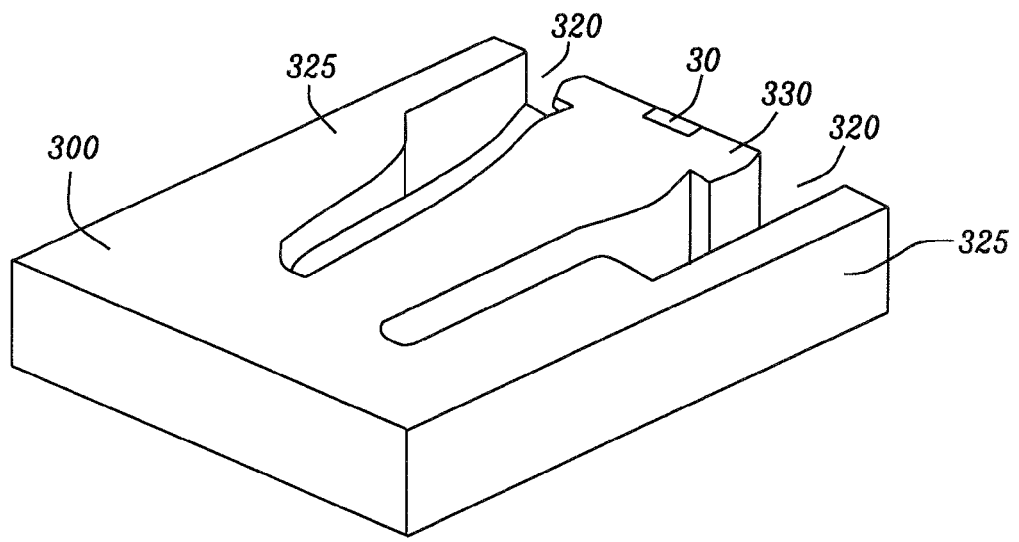
FIG. 2 is a schematic representation of a prior art slider drawn in isometric view to illustrate a simple pattern of channels.
Figure 3:
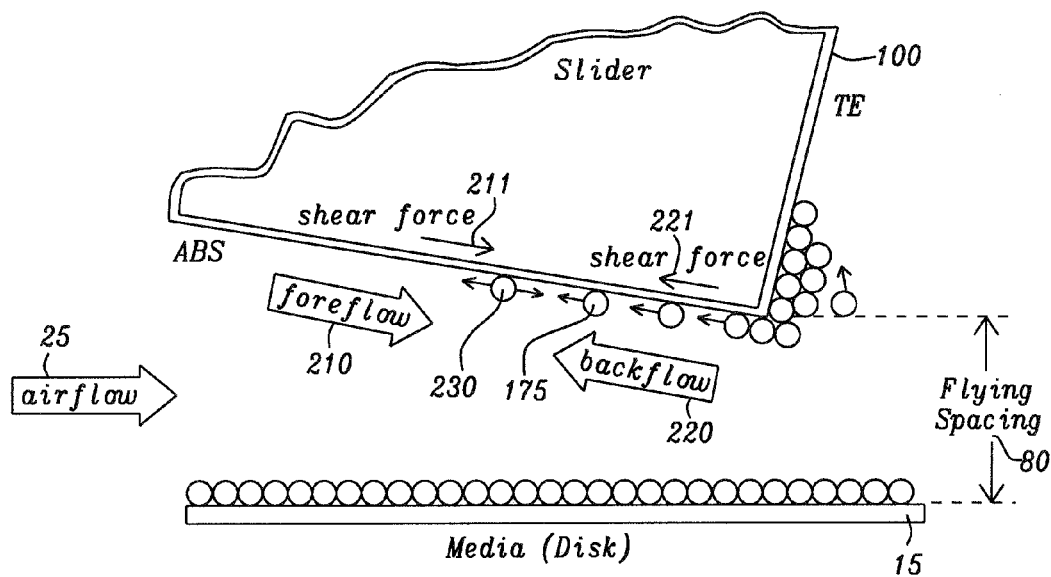
FIG. 3 is a schematic representation of the prior art slider of FIG. 1 showing how hydrocarbon lubricant becomes entrained in airflow and enters the slider.
Figure 4:
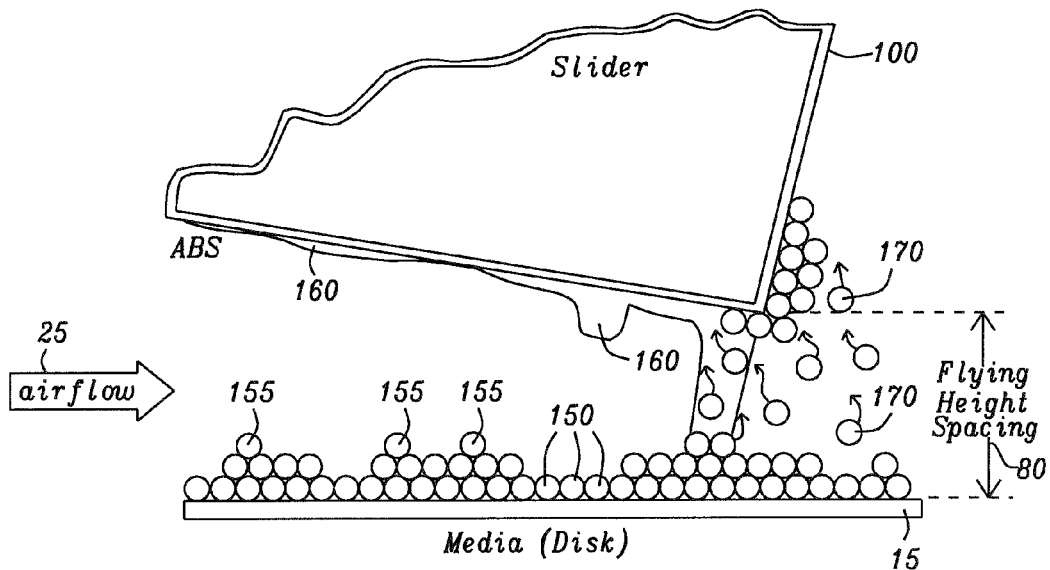
FIG. 4 is a schematic representation of the next step of the prior art process shown in FIG. 3 showing how lubricant accumulates in regions of airflow stagnation.
Figure 5:
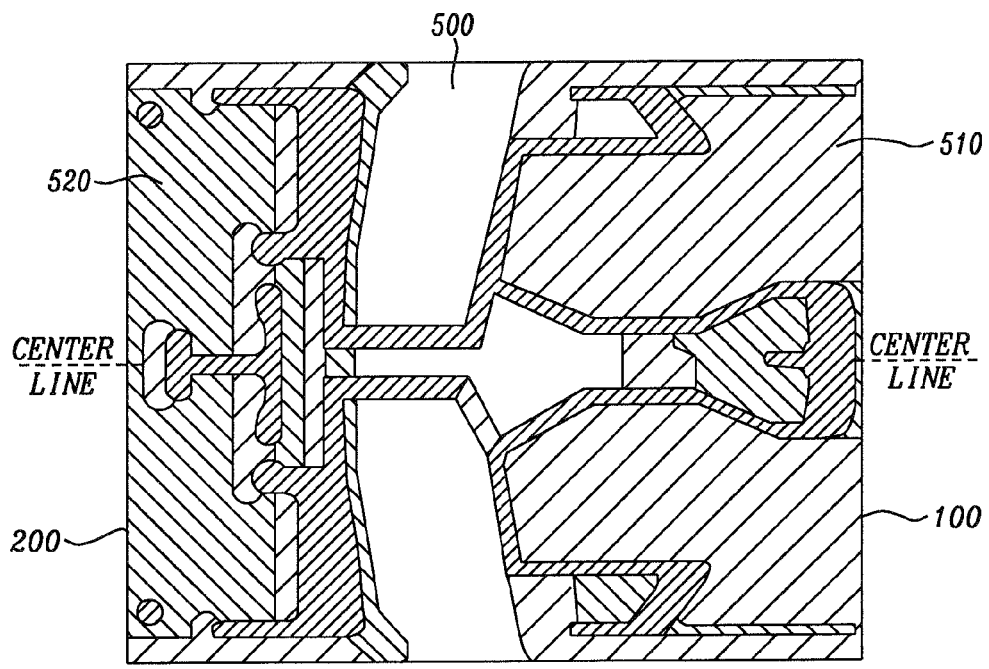
FIG. 5 is a schematic representation of the ABS topography of an advanced air-bearing design that forms the basis of the present disclosure.

We describe a slider for an HDD having a topography etched into its air-bearing surface (ABS) that eliminates the accumulation of hydrocarbons and lubricants that normally results from their entrainment in the ABS airflow patterns and leads to accumulations in regions where the airflow stagnates. Referring first to FIG. 5, there is shown, schematically, a slider ABS in which there is etched, by three successive ion-milling (IM) processes, a total of four patterned layers at various depths relative to (and including) an upper surface that comprises the air-bearing surface ABS. These layers include the tops of ridges and bases of channels and cavities that, together, produce an airflow pattern that provides required aerodynamic stability of the slider during HDD operation. These features, when augmented by patterns of micro-dots projecting upward from the floors of various cavities, will provide the basis for the elimination of stagnant regions in which entrained lubricant and hydrocarbons would tend to be deposited and to accumulate in time. The depths of the successively formed layers relative to the uppermost ABS surface are indicated by degrees of shading in the illustrative figure, where no shading (white) indicates the deepest etched level relative to the uppermost ABS surface and the densest shading indicates the uppermost slider surface itself, which will be denoted the ABS. As is shown, the topography includes a deep cavity, 500, which is substantially transversely symmetric about a center-line bisecting the leading, 200, and trailing, 100, edges. Note that use of the term "horizontal", as in "horizontal cross-section," will refer to the plane of the ABS.

The deepest (or third) cavity, 500, is formed last, by a third and final etching process of greatest depth $E_3$, after a sequence of etching processes have occurred. A second cavity, 510, is on the trailing edge side of the first cavity and is slightly shallower than the first cavity. The second cavity is formed by a second etching process, etching to a depth $E_2$. A shallow step, 520, (also referred to as a first cavity) is immediately adjacent to the leading edge, 200. This first cavity is slightly below the upper ABS surface and characterized by a first etched depth $E_1$. These three cavities provide the aerodynamic pressure gradients that produce backflows and foreflows. The various ridges and slight asymmetries due to ridges and channels that border the cavities or pass through them help guide the airflow and maintain aerodynamic stability as the slider moves across the disk surface between larger and smaller radii. The remainder of this disclosure will focus on the three cavities, 500, 510 and 520, their roles in creating accumulation of hydrocarbons and lubricant residues and a method to eliminate those accumulations. The present slider body is 850 microns in length and 700 microns in width. The three cavity depths, measured from the upper ABS, are $E_3$=2.8 microns, $E_2$=1.15 microns and $E_1$=0.15 microns. We note that other overall dimensions of the slider body are possible, such as a slider body length of 1235 microns and width of 700 microns, but in whatever design is involved, there will be regions of airflow and regions of flow stagnation where hydrocarbons accumulate. The methods to be discussed in the following can be applied to such other designs as well.

Figure 6:
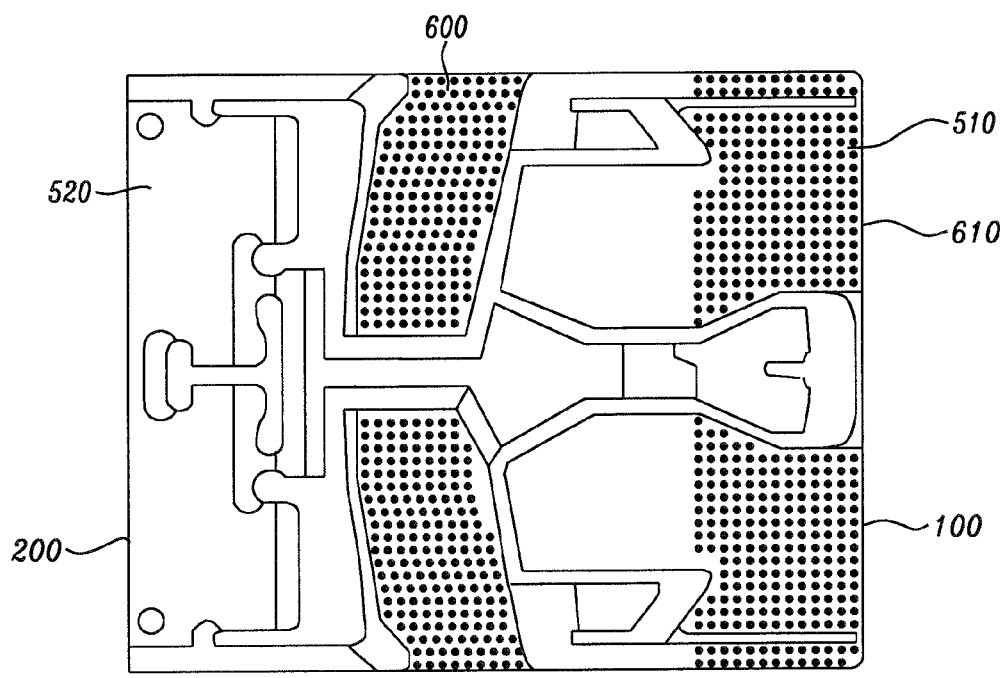
FIG. 6 is a schematic representation of the ABS topography of FIG. 5 with the addition of a pattern of micro-dots formed in a deep cavity and a shallower cavity.

Referring next to FIG. 6, there is shown the slider of FIG. 5 with the addition of patterns of raised micro-dots, 600 and 610, covering, respectively, portions of the floors of the deep ($E_3$) cavity, 500, and the second ($E_2$) cavity (cavity 2), 510. These micro-dots will mitigate or eliminate backflows and, thereby, correspondingly eliminate or mitigate regions of airflow stagnation and hydrocarbon accumulation. Note that, for clarity, the shadings have been eliminated from FIG. 6 so that the micro-dots are more easily visualized. FIG. 5 can be referred to for the shadings.

The micro-dots, which may be of any horizontal (ABS plane) cross-sectional shape, including circles, squares, regular polygons and may be distributed in a uniform or multi-shaped (in cross-section) array with regular (or variable) spacing and height that, in FIG. 6, reach to below the ABS surface. Typical cross-sectional sizes (e.g., diameters in the case of circles) that produce the desired effects are typically less than 100 microns and preferably in the range between approximately 2 microns to 100 microns. Typical spacings associated with the above sizes are in the range between approximately 2 microns to 100 microns.

Using the ABS surface as a reference, the micro-dots can be created by etching around them (using a patterned mask), to create successive cavity surfaces at depths between approximately 0.01 microns and 5 microns, yet leaving the pattern of micro-dots protected by the mask and remaining. In the embodiment shown in FIG. 6, the micro-dots rising from the floors of both cavities 500 and 510 are 0.15 microns in height and 6 microns in diameter. However, the micro-dots can have heights between 0.01 microns and 5 microns. Depending on the area of the backflow region, the micro-dots can be placed over the entire base of a cavity or only to partially cover its base. The method of formation of the micro-dots is to pattern their arrays on the upper ABS surface and then etch around them using etch masks and ion milling.

Figure 7:
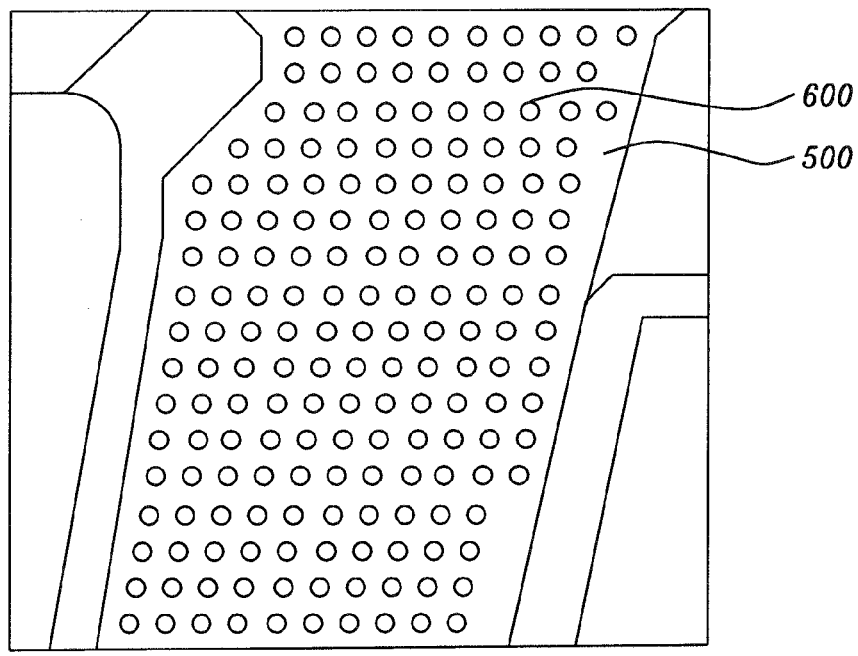
FIG. 7 is a magnified view of the deepest cavity in FIG. 6.

Referring to schematic FIG. 7, there is shown a magnified illustration of a pattern of micro-dots, 600, formed on the base of deep cavity 500. These micro-dots have been etched so that their tops are 0.15 microns above the floor of the cavity. Note that shadings have been omitted for clarity.

Figure 8:
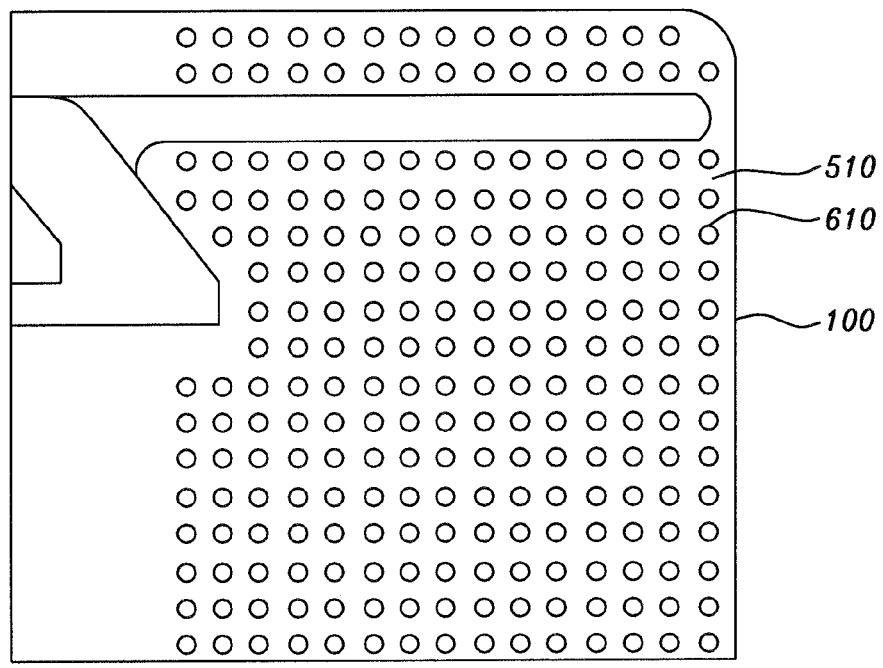
FIG. 8 is a magnified view of a shallower cavity in FIG. 6.

Referring to schematic (and unshaded) FIG. 8 there is shown the pattern of micro-dots, 610, that partially covers the base of second cavity (cavity 2), 510, the cavity whose depth is $E_2$, between that of deep cavity 500 ($E_3$) and shallow step 520 ($E_1$). The micro-dots in cavity 510 also rise 0.15 microns in height from the base of cavity 510. As noted above, however, these heights are exemplary and will vary, along with their other characteristics (diameter, shape, spacing), depending on the airflow patterns of the slider.

Figure 9:
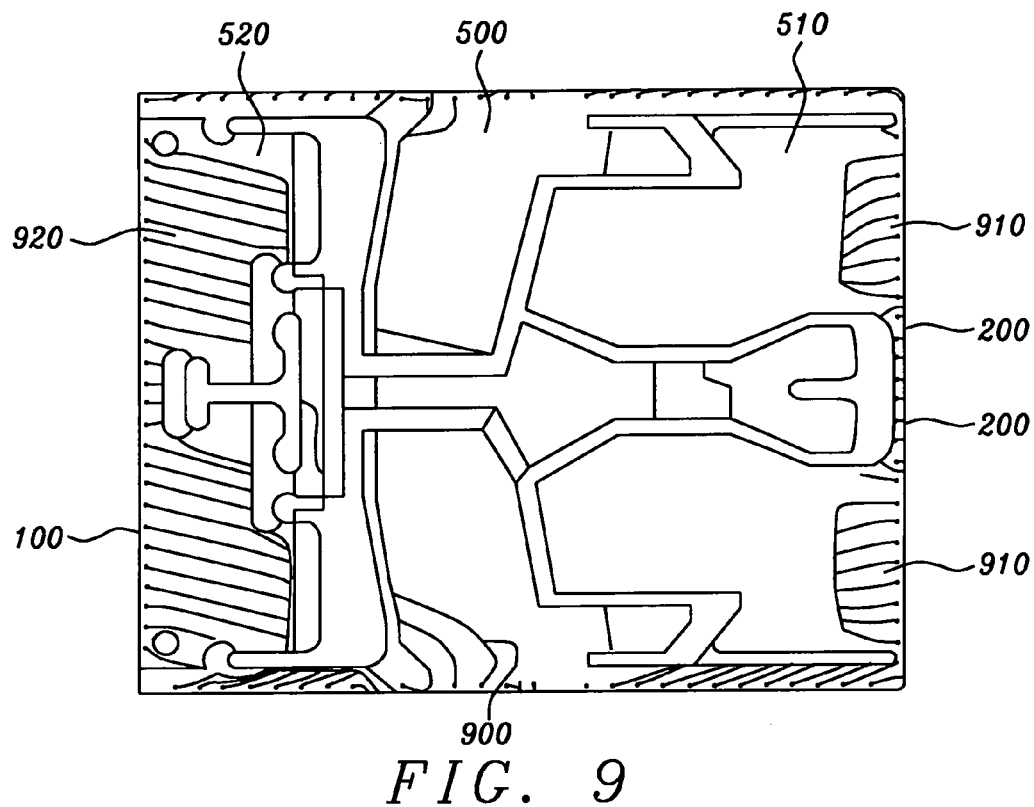
FIG. 9 is a schematic illustration showing the streamlines in the ABS topography of FIG. 5.
Figure 10:
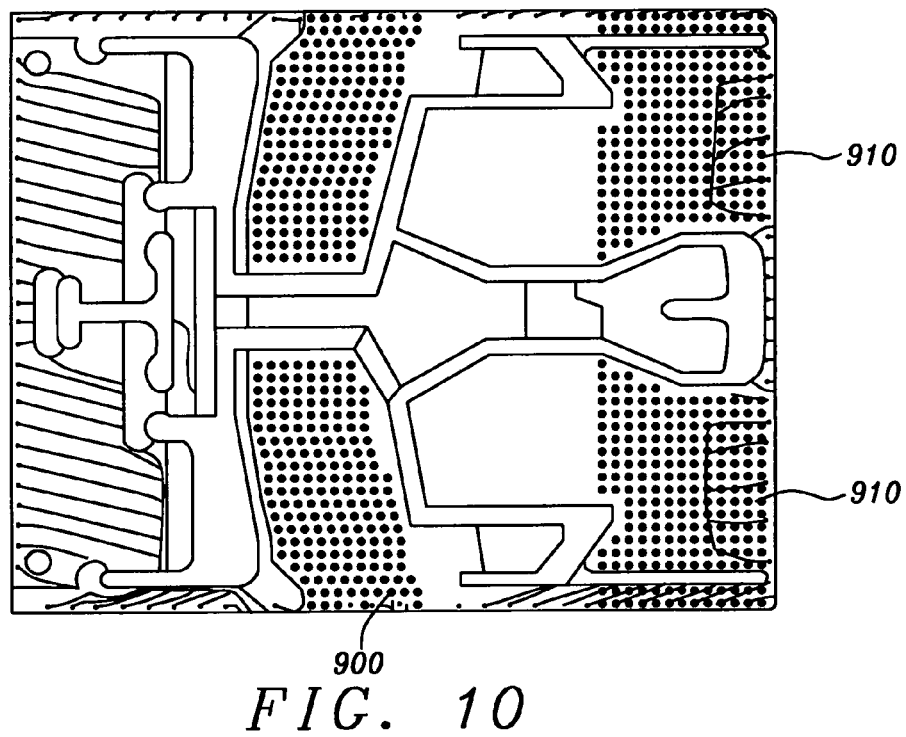
FIG. 10 is a schematic illustration showing the streamlines in the ABS topography of FIG. 6.

As will be seen in (unshaded) FIGS. 9 and 10, the role of the micro-dots is to act somewhat like a pattern of islands and to reduce or eliminate backflows so that lubricant and hydrocarbon will not find regions of airflow stagnation at which they can be deposited and accumulate. Empirical evidence has shown that the region of hydrocarbon deposition is primarily the region within which airflow goes to zero.

Referring next to FIG. 9, there is shown the slider of FIG. 5 that has not been patterned with micro-dots, with exemplary flow-lines drawn in to show the regions of backflow and foreflow. The streamlines begin with a small dot and continue on as curved lines in the direction of airflow. Deep cavity, 500, shows lines of backflow, 900, (directed towards the leading edge, 200). Cavity 510 also shows lines of backflow 910, emanating from trailing edge, 100. Cavity 520 shows lines of foreflow, 920.

Referring to FIG. 10, there is shown the slider of FIG. 9 containing the arrays of micro-dots whose effect is seen to be the elimination or reduction of the lines of backflow (900 and 910) shown in FIG. 9.

A preferred sequence of ion-milled etches to create the micro-dot patterned slider of FIG. 6 would comprise five ion-milling etches, using various combination of three different hard masks and etches to three successive depths of 0.15 microns, 1.0 microns and 1.65 microns to produce the proper cumulative depths of structures. The combined masks and etches using them will produce the three cavities whose bases are at 0.15 microns below the ABS, at 1.15 microns below the ABS and at 2.8 microns below the ABS. Further, the second and third of these cavities will each have an array of micro-dots rising 0.15 microns from their bases.

Each of the sequence of ion-milling etches requires masking a region, using a succession of hard masks formed by photo-lithographical processing, so that a protected portion of the region remains untouched by each particular etch and an unprotected region is etched away down to a selected depth. The unprotected regions will then have various features (including ridges, channels and cavities) defined at the depths (relative to the ABS) of the ion-milling etches. The etch sequence will be described in terms of the use of three hard masks and etching depths associated with each mask.

These masks/depths will be denoted mask B (etch depth of 1.65 microns), mask C (etch depth of 0.15 microns) and mask D (etch depth of 1.0 microns). Mask C will be used to define the topography that results from an etch down from the ABS to a depth of 0.15 microns. This etch will produce (among other features seen in FIG. 6) the shallow cavity (or step), denoted cavity 1 and shown as 520 in FIG. 6. Mask D will be used to define the tops of the micro-dots (610 in FIG. 6) that will be formed on the base of cavity 2 (510 in FIG. 6). Mask D will be used in conjunction with an etch of depth 1.0 microns so that the tops of the micro-dots in cavity 2 will be 1.0 microns below the ABS. Next, the level of the base of cavity 2 (510 in FIG. 6) will be defined by the use of masks C+D and will produce a combined etch depth of 1.15 microns below the ABS. Next, the micro-dots (600 in FIG. 6) covering the base of the deepest cavity (500 in FIG. 6) are defined by the combined result of the use of masks D+B to produce an etch depth of 2.65 microns (0.15 microns above the base of cavity 500). Finally, the combination of masks C+D+B are used to produce a final etch depth of 2.8 microns for the base of the deepest cavity (500 in FIG. 6). Again, it is emphasized that the configuration of micro-dots, their locations and degree of coverage will ultimately depend on the slider topography and airflow patterns.

As is understood by a person skilled in the art, the present description is illustrative of the present disclosure rather than limiting of the present disclosure. Revisions and modifications may be made to methods, materials, structures and dimensions employed in forming and providing a HDD-mounted slider having an ABS topography that eliminates hydrocarbon accumulation while still forming and providing such a device and its method of formation in accord with the spirit and scope of the present disclosure as defined by the appended claims.

What is claimed is:

1. A slider for a hard-disk drive (HDD) comprising:
   a slider body of substantially rectangular horizontal cross-section having a leading edge (LE), a trailing edge (TE) parallel to said leading edge and an upper surface defining an air-bearing surface (ABS);
   a multiplicity of cavities formed in said slider body, wherein said cavities are formed transversely and symmetrically about a center-line and are formed at different depths relative to said ABS and wherein said cavities include:
   a first cavity adjacent to said leading edge having a base formed at a depth $E_1$;
   a second cavity adjacent to said trailing edge having a base formed to a depth $E_2$;
   a third cavity formed substantially midway between said first and second cavities and having a base formed to a depth $E_3$; and wherein
   $E_3 > E_2 > E_1$ and wherein
   at least one of said cavities has an array of micro-dots formed on said cavity base that rise from said at least one cavity base and wherein said micro-dots are dimensioned vertically and horizontally, corresponding to the dimensions of said at least one cavity and configured by a pattern of distribution on said at least one cavity base to eliminate regions of airflow stagnation created during operation of said HDD and, thereby, to eliminate regions of hydrocarbon accumulation.

2. The slider of claim 1 wherein said array of micro-dots is configured to eliminate regions of aerodynamic backflow which create said regions of airflow stagnation when encountering regions of foreflow.

3. The slider of claim 1 wherein said horizontal dimensions are 850 microns in length and 700 microns in width.

4. The slider of claim 1 wherein said micro-dots are formed with arbitrary horizontal cross-sectional shapes, including circles, squares, diamonds or rectangles.

5. The slider of claim 4 wherein all micro-dots in an array have the same one of said arbitrary cross-sectional shapes.

6. The slider of claim 1 wherein said array of micro-dots includes micro-dots of different cross-sectional shapes.

7. The slider of claim 1 wherein said three etch depths, measured from the upper ABS, are $E_3=2.8$ microns, $E_2=1.15$ microns and $E_1=0.15$ microns and there are three cavities formed, each with a base at one of those depths.

8. The slider of claim 7 wherein said array of micro-dots covers the entire base of said cavity whose base is at a depth of 2.8 microns.

9. The slider of claim 8 wherein an array of micro-dots partially covers a base of said cavity whose base is at a depth of 1.15 microns.

10. The slider of claim 2 wherein said micro-dots have horizontal cross-sectional sizes in the range between approximately 2 microns to 100 microns.

11. The slider of claim 9 wherein micro-dots in said array are substantially uniformly spaced with height above said cavity bases of approximately 0.15 microns.

12. The slider of claim 2 wherein the tops of said micro-dots are between approximately 0.01 microns and 0.15 microns below said ABS surface.

13. The slider of claim 1 wherein said horizontal dimensions are 1235 microns in length and 700 microns in width.

* * * * *